Dec. 17, 1929.  W. G. HAGMAIER ET AL  1,740,085
BAND SAW MILL
Filed April 28, 1926  4 Sheets-Sheet 3
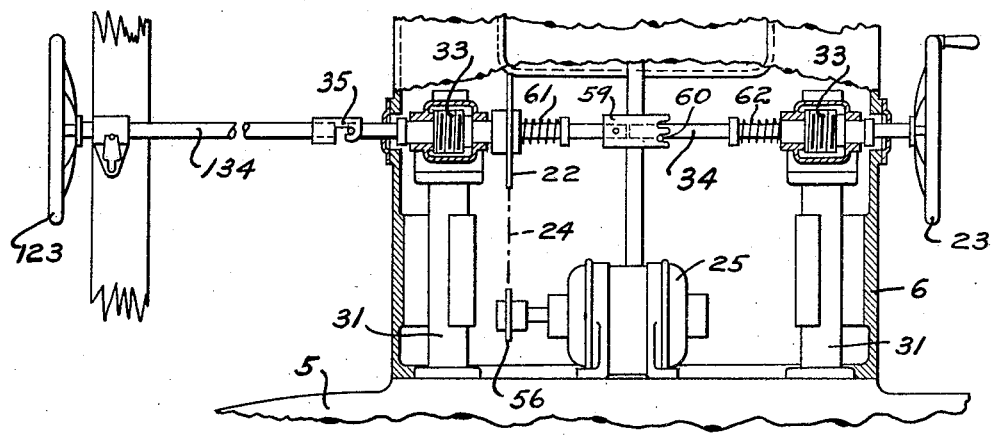
Fig. 4
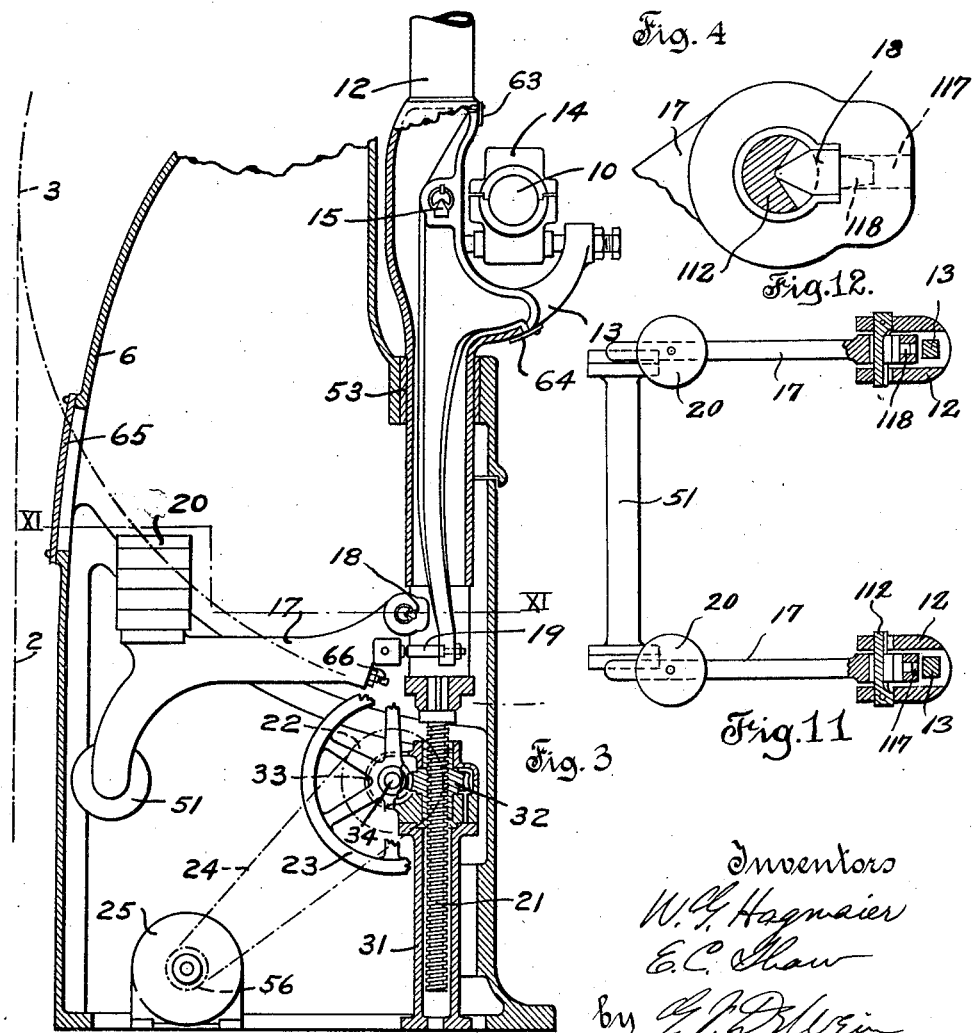

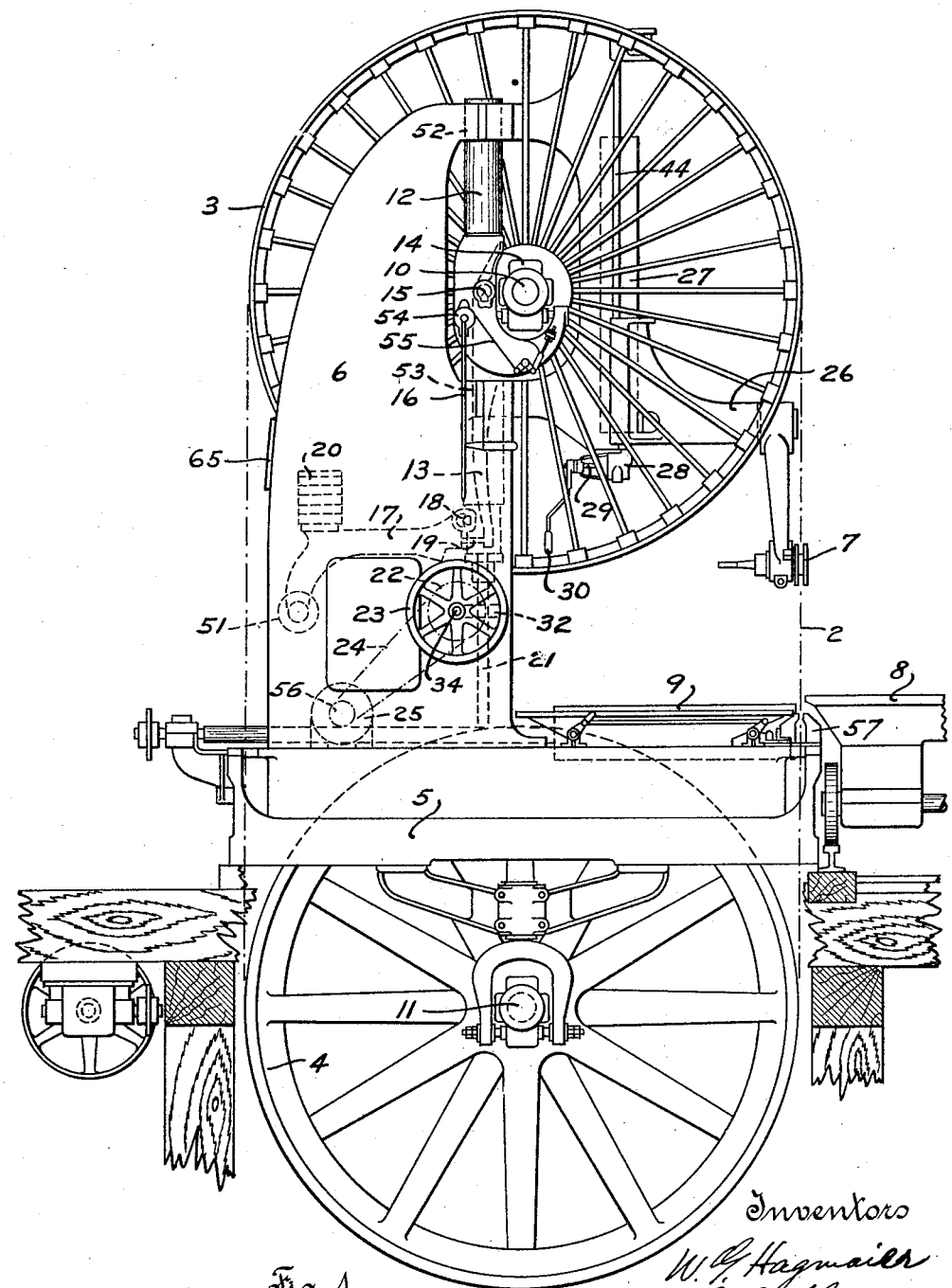

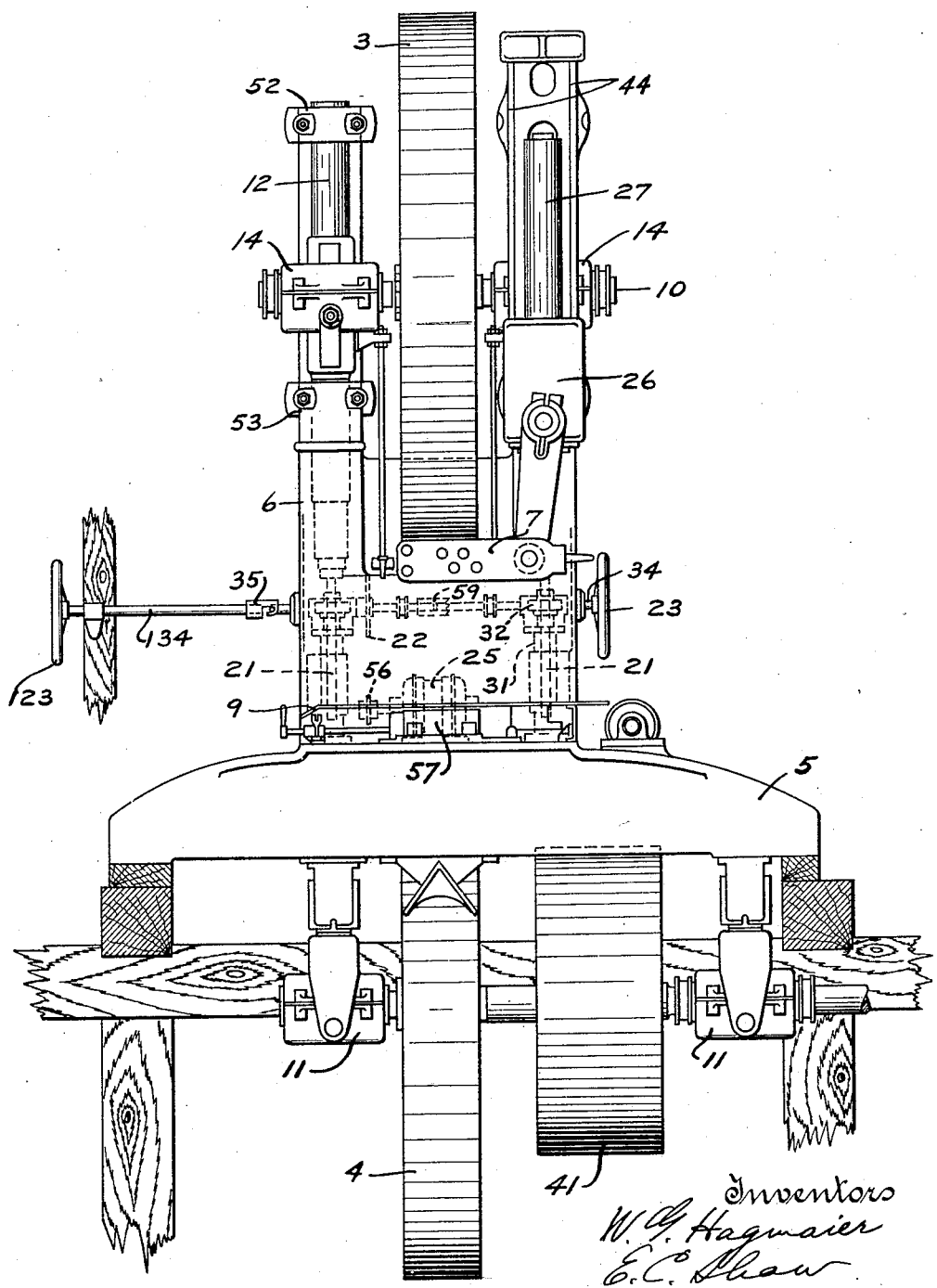

Dec. 17, 1929.                    W. G. HAGMAIER ET AL                    1,740,085
                                        BAND SAW MILL
                             Filed April 28, 1926            4 Sheets-Sheet 4
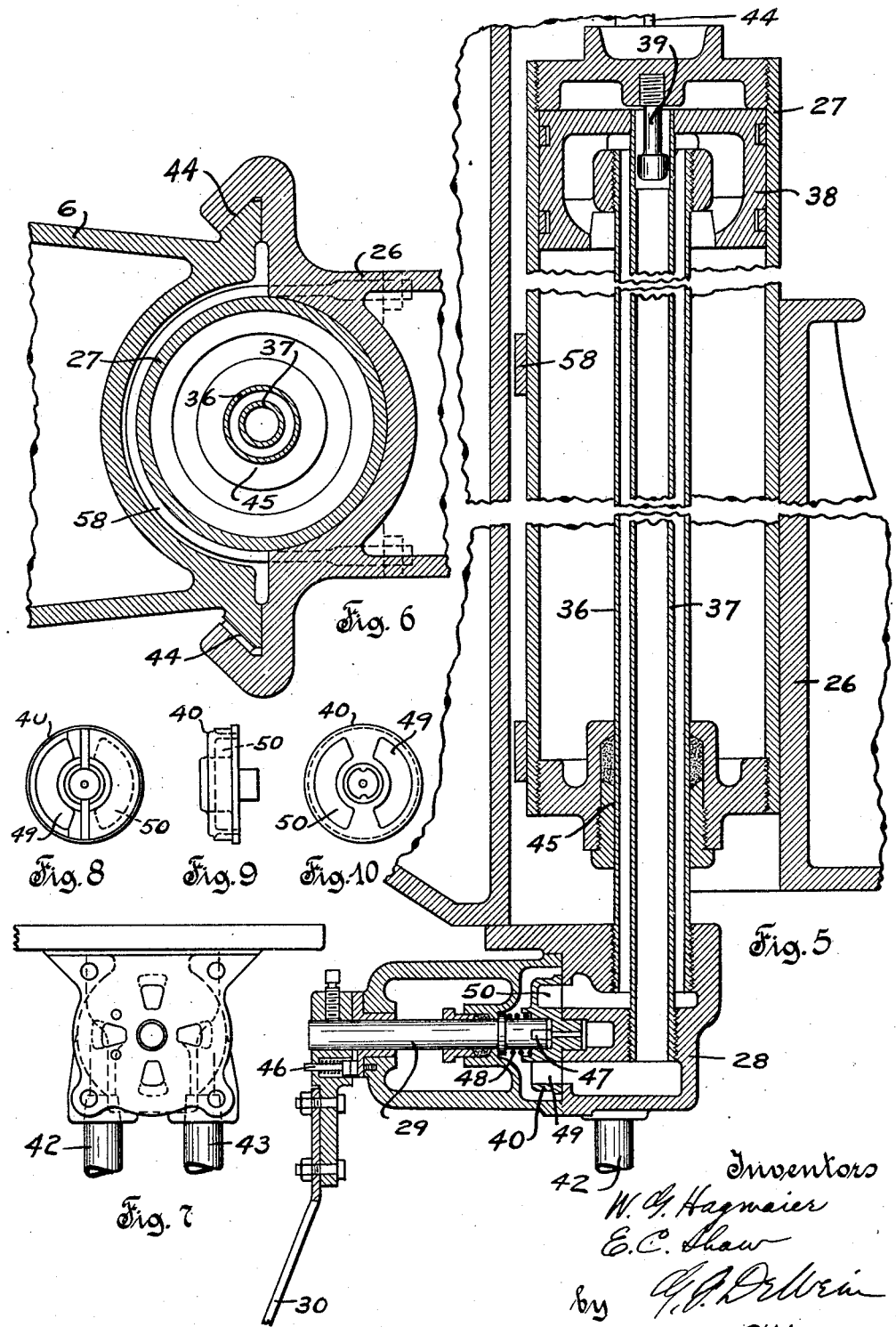

Patented Dec. 17, 1929

1,740,085

UNITED STATES PATENT OFFICE

WILLIAM G. HAGMAIER, OF WEST ALLIS, AND ERNEST C. SHAW, OF MILWAUKEE, WISCONSIN, ASSIGNORS TO ALLIS-CHALMERS MANUFACTURING COMPANY, OF MILWAUKEE, WISCONSIN, A CORPORATION OF DELAWARE

BAND-SAW MILL

Application filed April 28, 1926. Serial No. 105,078.

This invention relates in general to improvements in the art of sawing logs into lumber, and relates more specifically to improvements in the construction and operation of band saws of the type wherein an endless saw band cooperates with and is driven by a pair of spaced wheels rotatable about parallel axes.

An object of the invention is to provide a band saw mill which is simple in construction and efficient in operation. Another object of the invention is to provide improved mechanisms for permitting removal of the saw band, for effecting adjustment of the saw supporting wheels, and for properly tensioning the saw band of a band mill. A further object of the invention is to provide improved frame structure for band mills, wherein the various carrier wheel and saw band adjusting mechanisms are completely but accessibly housed within a substantial frame. Still another object of the invention is to provide an improved adjustable guide for band saws or the like. These and other objects and advantages will be apparent in the course of the following description.

A clear conception of an embodiment of the invention and of the operation and mode of manipulating devices constructed in accordance therewith, may be had by referring to the drawings accompanying and forming a part of this specification in which like reference characters designate the same or similar parts in the various views.

Fig. 1 is a side elevation of an improved vertical band mill.

Fig. 2 is a front elevation of the improved vertical band mill, looking toward the cutting side of the structure and having the saw band removed therefrom.

Fig. 3 is a fragmentary enlarged sectional view of the band wheel and saw band adjusting and tensioning mechanisms.

Fig. 4 is a fragmentary enlarged sectional view showing details of construction of the band wheel adjusting mechanism.

Fig. 5 is an enlarged fragmentary central vertical section through the fluid pressure actuated saw guide adjusting mechanism.

Fig. 6 is an enlarged fragmentary transverse sectional view through the fluid pressure actuated guide adjusting mechanism.

Fig. 7 is a view of the improved fluid pressure control valve seat.

Fig. 8 is a front elevation of the improved fluid pressure control valve body.

Fig. 9 is a side elevation of the improved fluid pressure control valve body.

Fig. 10 is a rear elevation of the improved fluid pressure control valve body, looking toward the seating side thereof.

Fig. 11 is a fragmentary part sectional top view of a portion of the adjusting and tensioning mechanism.

Fig. 12 is an enlarged fragmentary part sectional side view of one of the weight lever fulcrums.

The improved band mill comprises generally an endless saw band 2 cooperating with upper and lower band wheels 3, 4 respectively, the latter of which is rotatable by means of power applied to a driving pulley 41. The lower band wheel 4 and the driving pulley 41 are mounted upon a horizontal shaft supported by bearings 11 associated with the underside of a main base plate 5. The upper band wheel 3 is secured to a shaft 10 which is supported in adjustable bearings 14 carried by tensioning levers 13. The tensioning levers 13 are housed within upright hollow columns 12 which are slidably mounted in guide bearings 52, 53 formed in a hollow main frame 6 which rests upon the main base plate 5. The tensioning levers 13 are movable within the columns 12 about fulcrums 15 and sealing plates 64, 65 serve to prevent entry of dirt to the interior of the columns 12 due to adjustment of the levers 13.

Each of the tensioning levers 13 may be provided with a tension indicator 16 as shown in Fig. 1, comprising a swingable arm operable by a band 55 cooperating with a drum 54 associated with the arm pivot. The band 55 is connected to the adjacent tensioning lever 13 by means of suitable levers in an obvious manner, in order to cause the arm 16 to assume a predetermined position corresponding to a definite tension on the saw.

The lower extremity of each lever 13 is provided with an abutment 19, the abutments 19 of both of the levers 13 coacting with adjacent abutments formed upon a common bifurcated weight lever 17. The weight lever 17 is supported upon swivel fulcrums 18 cooperating with the columns 12 through cross pins 112 as shown in Figs. 11 and 12, and is provided with a rigid cross-connection 51 and a plurality of removable tension varying weights 20. The swivel fulcrums 18 have knife edges coacting with recesses in the pins 112, and are also provided with pivots 118 cooperating with openings 117 in the weight lever 17, in order to permit slight pivotal movement of the fulcrums 18. The lower end of each column 12 is supported upon a threaded vertical spindle 21 and each forwardly projecting arm of the weight lever 17 is provided with a stop 66 adapted to coact with the supporting cap of an adjacent spindle 21, to limit the downward swinging motion of the weight lever 17. The threads of each spindle 21 are engaged by internal threads of a worm wheel 32 rotatably supported upon a tubular casing 31 mounted upon the base plate 5 and held in position by an integral extension formed on the interior of the main frame 6. The worm wheels 32 coact with worms 33 splined upon the sections of a horizontal adjusting shaft 34 which is rotatably supported in substantially horizontal position within the frame 6. The sections of the shaft 34 are normally connected by means of a jaw member 59 secured to one of the shaft sections and interlocking with a pin 60 secured to the other, the pin 60 being normally retained within a jaw of the member 59 by means of springs 61, 62 coacting with collars on the shaft sections, as shown in Fig. 4. An adjusting motor 25 mounted upon the base plate 5 within the frame 6 is drivingly connected to a sprocket 56 which is connected by means of a chain 24 to a sprocket wheel 22 mounted upon the shaft 34. The hand wheel 23 is secured directly to one end of the sectional shaft 34, and the opposite end of the shaft 34 is detachably connected by means of a releasable connection 35, to a shaft 134 having a hand wheel 123 associated therewith. The weight lever 17, motor 25, and the mechanism for transferring motion from the motor to the columns 12, are all housed within the hollow main frame 6 which is provided with one or more removable rear covers 65 and suitable side covers for permitting convenient access to the weights 20 and to the motor 25.

The front or cutting stretch of the saw band 2 passes through a lower stationary guide 57 having separable guiding jaws, and through an upper vertically adjustable and rapidly removable guide 7. A carriage 8 is formed to transport the logs which are to be sawed, in proximity to the saw band 2 and the lumber is removable from the band mill after falling upon a receiving plate 9, by transfer rolls in a well known manner. The upper guide 7 is supported by a bracket 26 which is secured to a vertically adjustable cylinder 27 by means of straps 58. See Figs. 5 and 6. The guide adjusting cylinder 27 is slidably associated with a stationary piston 38 which is supported by inner and outer upright fluid conducting pipes 37, 36. The lower end of the cylinder 27 is provided with a combined stuffing box and guide bearing 45 slidably cooperating with the outer pipe 36, and the upper head of the cylinder 27 is provided with a cushioning device 39 of well known construction. The pipes 36, 37 are secured to a fluid admission and exhaust head 28 located below the cylinder 27 and rigidly attached to an extension of the main frame 6. The cylinder 27 is also guided relatively to the main frame 6 by means of guideways 44 as shown in Fig. 6, the features of the fluid pressure actuated guide adjusting mechanism thus far described being well known as shown in Patent No. 899,575 granted September 25, 1908.

The admission and exhaust head 28 is provided with an air supply pipe 42 and with an exhaust pipe 43 communicable through the head 28 with ports 49, 50 of a rotary control valve 40. The valve 40 is urged toward its plane seat by means of a spring 48 and is operable to alternately admit and exhaust air under pressure to and from opposite sides of the piston 38, by means of a valve stem 29 having a crossbar 47 cooperating with a recess in the valve 40. The stem 29 is rotatable by means of a handle 30 provided with an indicating device 46 for designating the position of the valve.

During normal operation of the mill, the wheel 4 is being rotated by the application of power to the pulley 41 thereby causing saw band 2 to travel in a predetermined direction and to simultaneously rotate the upper band wheel 3. The logs are urged against the moving saw band 2 by means of the carriage 8 and the lumber falls upon the receiving table 9 and is removed therefrom by the transfer rolls. The saw band 2 is properly tensioned by the application of a predetermined number of weights 20 to the weight lever 17 and the guide 7 is set to provide a support for the saw blade 2 as near as possible to the cutting portion of the saw.

When it is desired to vary the tension of the blade 2, weights 20 may be added or removed from the lever 17 by removal of the plate 65. These weights 20 cooperate through the weight lever 17 and fulcrum 18 to push against the abutment 19 and to simultaneously urge the tensioning levers 13 about their fulcrums 15 in a counter-clockwise direction as viewed in Fig. 3. The pressure thus applied to the tensioning levers 13 produces upward pressures against the ends of the wheel supporting shaft 10 and hence subjects the vertical stretches of the saw band 2 to tension. If it is desired to tilt the carrier wheel 3 in order to cause the saw band 2 to run true, weights 20 may be added or removed from one side only of the lever 17, thereby relatively varying the pressures exerted upon the two tensioning levers 13, and hence upon the opposite ends of the shaft 10. During such addition or removal of weights 20 from one side of the lever 17 only, the fulcrums 18 will oscillate slightly about their pivots 118 and will allow the levers 17 to properly adjust themselves without danger of breaking the fulcrums. It will be understood that such relative variation in pressure upon the two tensioning levers, in order to cause the band saw 2 to run true, is accompanied by relatively slight movement of the fulcrums 18, and that proper clearances are provided to permit such motion.

If it becomes desirable to remove the saw, the columns 12 may be lowered either by operating the motor 25 or by manipulating the hand wheels 123, 23. Rotation of the shaft 34 by the motor 25 or by the hand wheels, produces simultaneous rotation of the worms 33 and hence of the worm wheels 32, thereby causing the threaded spindles 21 to move vertically. By causing these spindles 21 to move downwardly, the tension upon the saw band 2 is quickly released and the band may then be freely removed from the carrier wheels 3, 4. When resubjecting the saw band 2 to tension, the columns 12 may be either simultaneously or independently vertically adjusted by virtue of the releasable clutch between the sections of the shaft 34. By pulling upon either of the hand wheels 123, 23, the corresponding spring 61, 62 is compressed and the pin 60 is moved out of interlocking engagement with the jaw member 59, thus permitting either of the hand wheels to be rotated independently of the other and producing a corresponding adjustment of one of the columns 12 independently of the other. This construction likewise permits tilting of the wheel 3 to insure true running of the saw band 2. The releasing element 35 permits the shaft section 134 to be removed at any time for purposes of facilitating removal of the saw blade. The extension afforded by the shaft section 134, however, enables disposition of the hand wheel 123 at a conveniently accessible place during normal operation of the machine.

When it is desired to vertically adjust the upper guide 7 the rotary valve 40 may be manipulated by means of the handle 30 to simultaneously admit fluid under pressure to one side of the piston 38 and to release the pressure from the other side. The inlet port of the head 28 which communicates with the supply pipe 42 may be connected at will to the ports leading to either of the opposed cylinder chambers, through the pipes 36, 37. When this inlet port is connected with one cylinder chamber through the valve port 49, the exhaust port 50 of the valve 40 is automatically connecting the opposite cylinder chamber with the exhaust pipe 43. The rotary valve 40 with its plane seating permits minimum escape of fluid thereby effectively retaining the guide 7 in adjusted position. It has been found impossible to effectively retain the pressure in the guide adjusting cylinder with a piston valve such as shown in the prior patent hereinbefore referred to, and the difficulties have been effectively eliminated with the use of the improved rotary valve.

It will be apparent that by enclosing the motor 25, the weight lever 17 and the column adjusting mechanism within the main casing 6, these elements are effectively protected against the entry of sawdust and other undesirable substances. The mechanisms are however accessible through suitable covers 65 associated with the rear of the frame 6 and other covers associated with the side thereof. The sealing plates 63, 64 likewise prevent ingress of sawdust or the like, to the interior of the columns 12 while permitting adjustment of the tension at any time. The tensioning levers 13 are effectively protected by virtue of their location within the columns 12, and the enclosure of the various parts presents a neat and compact appearance.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a band saw, a carrier wheel for said saw, a frame, a column adjustably associated with said frame, and a saw tensioning bell-crank lever the effective arm and bearings of which are housed within said column for adjustably supporting said wheel.

2. In combination, a band saw, a carrier wheel for said saw, a hollow slidable column, and a saw tensioning bell-crank lever fulcrumed upon and the effective arm and bearings of which are housed within said column for adjustably supporting said wheel.

3. In combination, a band saw, a carrier wheel for said saw, a hollow frame, a column adjustably associated with said frame, a saw tensioning bell-crank lever the effective arm and bearings of which are housed within said column for adjustably supporting said wheel, and means housed within said frame for varying the position of said column relative to said frame.

4. In combination, a band saw, a carrier wheel for said saw, a hollow frame, a hollow column slidably associated with said frame, a saw tensioning bell-crank lever the effective arm and bearings of which are housed within said column for adjustably supporting said wheel, and a weighted arm for moving said tensioning lever housed within said frame.

5. In combination, a band saw, a carrier wheel for said saw, a hollow frame, a hollow column slidably associated with said frame, a saw tensioning bell-crank lever the effective arm and bearings of which are housed within said column for adjustably supporting said wheel, a weighted arm for moving said tensioning lever, and means for moving said column relatively to said frame, said weighted arm and said moving means being housed within said frame.

6. In combination, a band saw, a carrier wheel for said saw, a hollow slidable column on each side of said saw, a saw tensioning bell-crank lever fulcrumed upon and the effective arm of each of which is housed within one of said columns for adjustably supporting said wheel, and a single weighted lever fulcrumed upon both of said columns for moving said tensioning levers.

7. In combination, a band saw, a carrier wheel for said saw, a column adjustably supporting said wheel on each side of said saw, a threaded rod movable with each of said columns, a threaded worm wheel coacting with each of said rods, a worm cooperating with each of said worm wheels to adjust said rods along the axes of said worm wheels, a motor for actuating said worms, and manually operable means for interchangeably and independently actuating said worms.

8. In combination, a band saw, a carrier wheel for said saw, columns disposed on opposite sides of said saw for adjustably supporting said wheel, a jack for adjusting each of said columns, a sectional shaft for either simultaneously or independently actuating both or either of said jacks, and a motor for rotating said shaft.

9. In combination, a band saw, a carrier wheel for said saw, columns disposed on opposite sides of said saw for adjustably supporting said wheel, a jack for adjusting each of said columns, a sectional shaft for either simultaneously or independently actuating both or either of said jacks, a motor for rotating said shaft, and manual means for interchangeably rotating said shaft.

In testimony whereof, the signatures of the inventors are affixed hereto.

WILLIAM G. HAGMAIER.
ERNEST C. SHAW